United States Patent
Koehler et al.

(10) Patent No.: US 7,926,267 B2
(45) Date of Patent: Apr. 19, 2011

(54) HYSTAT TRANSMISSION HAVING PRESSURE OVERRIDE CONTROL

(75) Inventors: Douglas W. Koehler, Peoria, IL (US);
Hyppolite Kuissi, Peoria, IL (US);
Sandeep J. Verghese, Peoria, IL (US);
Balbahadur Singh, Columbus, IN (US)

(73) Assignee: Caterpillar Inc., Peoria, IL (US)

( * ) Notice: Subject to any disclaimer, the term of this patent is extended or adjusted under 35 U.S.C. 154(b) by 498 days.

(21) Appl. No.: 12/076,613

(22) Filed: Mar. 20, 2008

(65) Prior Publication Data

US 2009/0235655 A1 Sep. 24, 2009

(51) Int. Cl.
*F16D 31/02* (2006.01)

(52) U.S. Cl. .............. 60/492; 60/445; 60/468

(58) Field of Classification Search .......... 60/445, 60/468, 490, 491, 492
See application file for complete search history.

(56) References Cited

U.S. PATENT DOCUMENTS

| | | | |
|---|---|---|---|
| 4,248,573 A | 2/1981 | Uehara et al. | |
| 4,329,845 A | 5/1982 | Parquet et al. | |
| 4,364,230 A | 12/1982 | Holmes | |
| 4,376,371 A | 3/1983 | Kojima et al. | |
| 4,476,680 A | 10/1984 | Pollman et al. | |
| 4,739,616 A | 4/1988 | Myers | |
| 4,745,746 A | 5/1988 | Geringer | |
| 5,191,950 A * | 3/1993 | Kleineisel et al. | 60/426 |
| 5,203,168 A | 4/1993 | Oshina et al. | |
| 5,265,422 A | 11/1993 | Watts | |
| 5,542,251 A * | 8/1996 | Leibing et al. | 60/492 |
| 6,405,530 B1 | 6/2002 | Brimeyer et al. | |
| 6,442,934 B1 | 9/2002 | Okuda et al. | |
| 6,966,180 B2 | 11/2005 | Deneir et al. | |
| 7,037,236 B2 * | 5/2006 | Ishibashi et al. | 60/445 |
| 7,281,373 B2 | 10/2007 | Kim | |
| 2003/0010026 A1 | 1/2003 | Evans et al. | |
| 2007/0130938 A1 | 6/2007 | Burgart et al. | |

* cited by examiner

*Primary Examiner* — Michael Leslie
(74) *Attorney, Agent, or Firm* — Finnegan, Henderson, Farabow, Garrett & Dunner LLP

(57) ABSTRACT

A transmission for use with a machine is disclosed. The transmission may have a pump, a motor fluidly connected to receive pressurized fluid from the pump and propel the machine, and an operator input device configured to generate a signal indicative of an operator desired gear ratio of the transmission. The transmission may also have a controller in communication with the pump, the motor, and the operator input device. The controller may be configured to determine an desired gear ratio of the transmission as a function of the signal, and determine an efficiency loss of the transmission at the desired gear ratio. The controller may also be configured to select a known setting of at least one of the pump and motor that provides the desired gear ratio and accounts for the efficiency loss.

20 Claims, 2 Drawing Sheets

HYSTAT TRANSMISSION HAVING PRESSURE OVERRIDE CONTROL

TECHNICAL FIELD

The present disclosure is directed to a hystat transmission and, more particularly, to a hystat transmission having pressure override control.

BACKGROUND

A hystat transmission is a type of continuously variable transmission having a hydraulic pump connected to a hydraulic motor in a closed loop configuration. The pump is driven by a power source, for example an engine. The motor is connected to a load, for example a traction device of a vehicle. As the engine operates, the pump is driven to pressurize hydraulic fluid. The pressurized hydraulic fluid is passed from the pump through the motor to drive the traction device and thereby propel the vehicle.

The speed and/or force of the motor can be operator controlled by varying a discharge of the pump in response to a received operator input. For example, when an operator depresses an accelerator pedal to indicate a desire for more speed or torque of the traction device, a discharge of the pump (flow and/or pressure) is proportionally increased. To protect components of the transmission from damage, operation of the pump and/or motor is commonly limited according to pressure. That is, when the pressure of the transmission exceeds a predetermined pressure, a valve is opened to relieve the pressure before damage can occur. Also in response to the high pressure, the pump output can be reduced to minimize the amount of fluid being relieved.

An example of a hystat transmission is described in U.S. Pat. No. 6,405,530 (the '530 patent) issued to Brimeyer et al. on Jun. 18, 2002. The '530 patent discloses a variable displacement pump arranged in a closed loop circuit with a hydraulic motor. The hydraulic motor is drivingly connected to the wheels of a vehicle. The pump is an axial piston type pump driven by an engine and having a movable swashplate to vary a displacement and directional output of the pump. The closed loop circuit also includes a servo mechanism movable to control an angle of the swashplate, and a pressure relief valve used to limit a maximum pressure of the circuit.

In operation, when an operator applies an input, a displacement magnitude signal is communicated to the servo piston to move the swashplate a proportional amount. The pressure relief valve establishes the maximum pressure differential of the circuit, and is controlled to selectively permit bypassing for towing or other purposes, as needed.

Although perhaps somewhat effective, this type of control can induce instabilities and reduce efficiency of the engine driving the pump. That is, proportional swashplate modulation of the prior art systems, coupled with the use of a pressure relief valve, can create a time lag exhibited in pressure fluctuations. Specifically, after circuit pressure has exceeded a maximum allowable pressure and the servo piston is moving to reduce swashplate angle, the pressure of the system may still be increasing until the servo piston has moved a significant distance. During this time, the pressure may spike, causing the pressure relief valve to open and relieve the spike in an attempt to minimize damage. When the pressure relief valve opens, the servo piston may still be moving to reduce pressures, even though the pressure relief valve has already opened and relieved the pressure. As a result, the angle of the swashplate can overshoot an equilibrium angle, causing a drop in the pressure. In response to the now low pressure, the servo piston may again be controlled to stroke up the displacement of the pump, and the cycle is repeated until the equilibrium pressure is finally attained. This instability can result in poor system response, while opening of the pressure relief valve can waste pressurized fluid and thereby reduce engine efficiency.

The transmission of the present disclosure solves one or more of the problems set forth above.

SUMMARY

One aspect of the present disclosure is directed to a transmission for use with a machine. The transmission may include a pump, a motor fluidly connected to receive pressurized fluid from the pump and propel the machine, and an operator input device configured to generate a signal indicative of an operator desired output of the transmission. The transmission may also include a controller in communication with the pump, the motor, and the operator input device. The controller may be configured to determine a desired gear ratio of the transmission as a function of the signal, determine an efficiency loss of the transmission at the desired gear ratio, and select a known setting of at least one of the pump and the motor that provides the desired gear ratio and accounts for the efficiency loss.

Another aspect of the present disclosure is directed to a method of transmitting power from an engine to a traction device. The method may include directing a mechanical input from the engine to pressurize fluid, and converting the pressurized fluid to a mechanical output of the traction device. The method may further include receiving an input related to an operator desired ratio of the mechanical input to the mechanical output, and determining an efficiency loss as a function of the desired ratio. The method may also include selecting a known conversion setting that provides the desired ratio and accounts for the efficiency loss.

DETAILED DESCRIPTION

Figure 1:
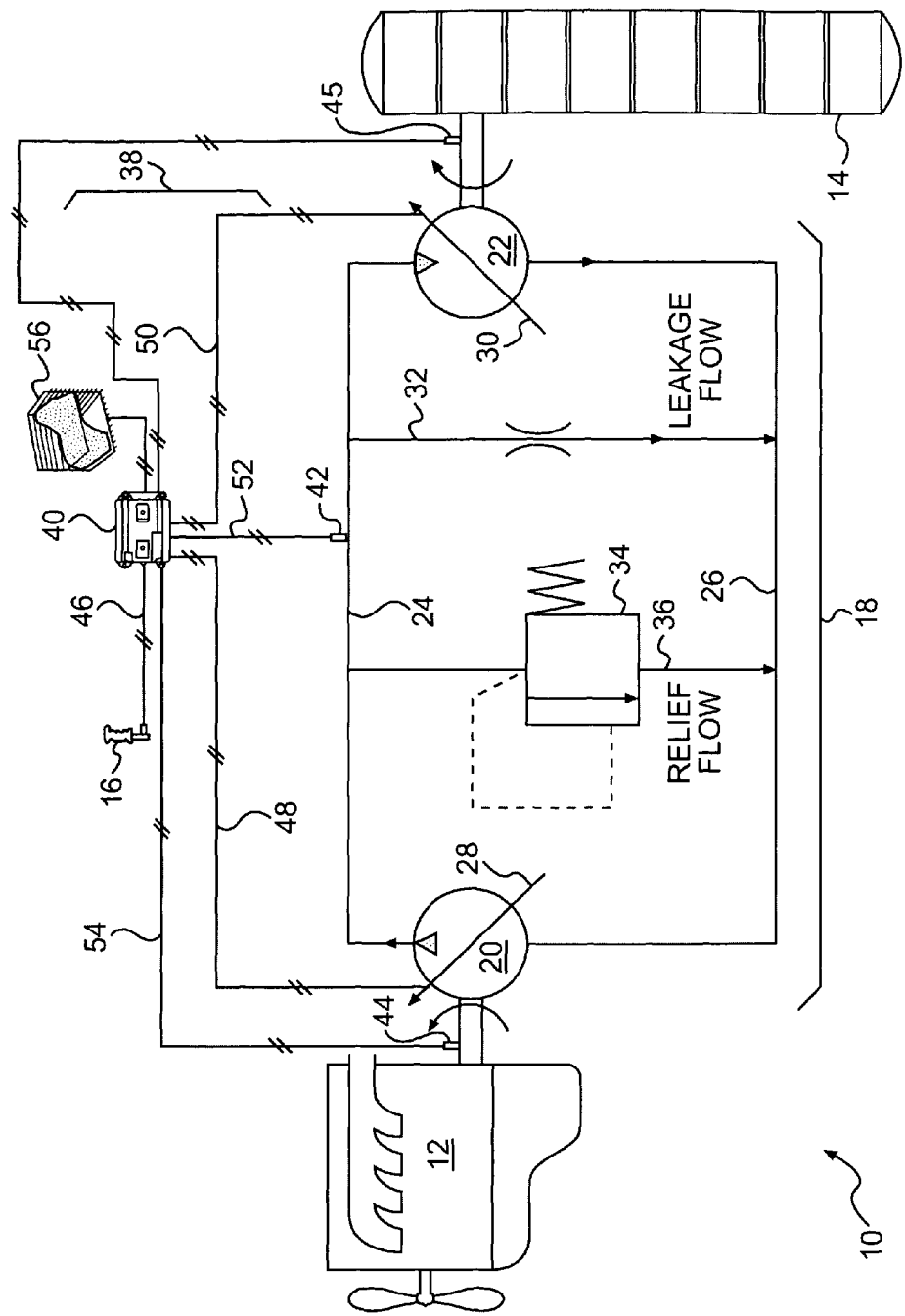
FIG. 1 is a diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine such as a track-type tractor, a skid-steer loader, a wheel loader, or an off-highway haul truck. Machine 10 may alternatively embody an on-highway truck, a passenger vehicle, or any other suitable operation-performing machine.

Machine 10 may include a power source 12, a traction device 14, an operator input device 16, and a transmission 18 configured to transmit a power output from power source 12 to traction device 14 in response to an input received via operator input device 16. It should be noted that, although only one transmission 18 and one traction device 14 are illustrated in FIG. 1, machine 10 may typically include two transmissions 18 and two traction devices 14 arranged into two substantially identical drive trains that can be powered by power source 12 and independently controlled by way of a single or multiple operator input devices 16.

Power source 12 may be configured to produce a power output and may include an internal combustion engine. For example, power source 12 may include a diesel engine, a gasoline engine, a gaseous fuel-powered engine, or any other type of engine apparent to one skilled in the art. It is contemplated that power source 12 may alternatively embody a non-combustion source of power such as a fuel cell, a battery, or an electric motor, if desired. Power source 12 may produce a rotational mechanical output received by transmission 18.

Traction device 14 may embody a track located on a side of machine 10. When two drive trains are included within machine 10, the two associated traction devices 14 may be located on opposing sides of machine 10 and simultaneously controlled to propel machine 10 or independently controlled to steer machine 10. Alternatively, traction device 14 may embody a wheel, a belt, or any other driven traction device. Traction device 14 may be driven by transmission 18 to rotate in accordance with an output rotation of power source 12.

Operator input device 16 may be located within an operator station of machine 10, for example, in close proximity to an operator's seat. Operator input device 16 may embody any one of numerous devices that control functions of machine 10. In one example, operator input device 16 may embody a joystick controller. It is contemplated, however, that operator input device 16 may embody additional or different control devices such as, for example, pedals, levers, switches, buttons, wheels, and other control devices known in the art.

Operator input device 16 may be manipulated to generate signals indicative of a desired output of transmission 18 (i.e., a desired travel speed, rimpull torque, and/or travel direction of machine 10). That is, as an operator displaces input device 16, a signal that is proportional to the displacement amount and direction may be generated and used to determine a desired gear ratio of transmission 18. In one example, a single operator input device 16 may be used to simultaneously control the movement of multiple traction devices 14. In another example, multiple operator input devices 16 may be used to independently control the movement of multiple traction devices 14.

Transmission 18 may be a continuously variable transmission having a pump 20 and a motor 22 coupled in a closed loop hydraulic configuration (i.e., transmission 18 may be a hystat transmission). Pump 20 may be mechanically driven by power source 12, while motor 22 may mechanically drive traction device 14 at a reduced ratio corresponding to a displacement position of input device 16. A first passageway 24 may direct pressurized fluid discharged from pump 20 to motor 22. A second passageway 26 may return used fluid from motor 22 to pump 20. It is contemplated that, in some embodiments, the functions of first and second passageways 24, 26 may be reversed to thereby reverse the travel direction of traction device 14, if desired.

Pump 20 may be a swashplate-type pump and include multiple piston bores (not shown), and pistons (not shown) held against a tiltable swashplate 28. One piston may be slidably disposed within each of the bores and biased into engagement with a driving surface (not shown) of swashplate 28. The pistons may reciprocate within the piston bores to produce a pumping action as swashplate 28 rotates relative to the pistons (swashplate 28 may rotate while the pistons and associated bores remain stationary, or the pistons and bores may collectively rotate while swashplate 28 remains stationary). Swashplate 28 may be selectively tilted relative to a longitudinal axis of the pistons to vary a displacement of the pistons within their respective bores. Although shown in FIG. 1 as producing only a unidirectional flow of pressurized fluid, it is contemplated that pump 20 may be an over-center type pump or rotatable in opposing directions to produce flows of fluid in opposing directions, if desired.

When swashplate 28 rotates relative to the pistons, the angled driving surface of swashplate 28 may drive each piston through a reciprocating motion within each bore. When the piston is retracting from the bore, fluid may be allowed to enter the bore. When the piston is moving into the associated bore under the force of the driving surface, the piston may force the fluid from the bore toward motor 22 via passageway 24. The angular setting of swashplate 28 relative to the pistons may be carried out by any actuator known in the art, for example, by a servo motor.

Motor 22 may be a fixed or variable displacement type motor fluidly coupled to pump 20. Motor 22 may convert the pressurized fluid from pump 20 into a rotational output of traction device 14. As a variable displacement motor, motor 22 may include multiple piston bores (not shown), and pistons (not shown) held against a fixed or rotatable swashplate 30. One piston may be slidably disposed within each of the bores, and biased into engagement with a driven surface of swashplate 30. Pressurized fluid may be allowed to enter the bores to force the pistons to move toward the driven surface. As the pistons press against the driven surface, swashplate 30 may be urged to rotate relative to the pistons (swashplate 30 may rotate while the pistons remain stationary, or the pistons may rotate while swashplate 30 remains stationary), thereby converting the fluid energy into a rotational output. The angle of swashplate 30 may determine an effective displacement of the pistons relative to the bores of motor 22. As swashplate 30 continues to rotate relative to the pistons, the fluid may be discharged from each bore to return to pump 20 by way of passageway 26. The angular setting of swashplate 30 relative to the pistons may be carried out by any actuator known in the art, for example, by a servo motor.

The displacement of pump 20, together with the displacement of motor 22, may affect a ratio of the speed and/or torque transferred from power source 12 to traction device 14 by transmission 18 (i.e., the displacement of pump 20 and motor 22 may affect an actual gear ratio of transmission 18). For the purposes of this disclosure, an actual gear ratio of transmission 18 may be considered the ratio of the input speed of transmission 18 (i.e., the output speed of power source 12) relative to an output speed of transmission 18 (i.e., the rotational speed of traction device 14). Thus, for a given mechanical input from power source 12 and for a fixed displacement of motor 22, a larger displacement of pump 20 may result in a higher speed and a lower torque rotation of traction device 14. Similarly, for the same input from power source 12 and for a fixed displacement of pump 20, a larger displacement of motor 22 may result in a lower speed and a higher torque rotation of traction device 14. By varying the displacements of both pump 20 and motor 22 simultaneously, a greater range of speed and torque may be provided to traction device 14 with finer control. The actual gear ratio of transmission 18 may be determined as a function of the input and out speeds of transmission 18, which may be measured values. However, it is contemplated that the actual gear ratio of transmission 18 may alternatively be determined as a function of the displacements of pump 20 and motor 22, if desired.

In some situations, it may be possible for the pressure of the fluid discharged by pump 20 to exceed an acceptable threshold value. If unaccounted for, these high pressures could result in damage of transmission 18 and/or unpredictable operation of power source 12 and traction device 14. In order to help minimize damage and ensure predictable operation of machine 10, a pressure relief valve 34 may be situated to selectively direct pressurized fluid from pump 20 to bypass motor 22 (i.e., to direct fluid from passageway 24 to passageway 26, without the fluid passing through motor 22) via a passageway 36. Although illustrated as a pilot operated, spring biased, valve mechanism, it is contemplated that pressure relief valve 34 could alternatively embody an electronic valve actuated in response to a measured pressure, if desired. As the pressure within passageway 24 exceeds the acceptable threshold value or, alternatively, as a pressure differential between passageways 24 and 26 exceeds a threshold value, pressure relief valve 34 may open to reduce the pressure of passageway 24.

Each time pressure relief valve 34 opens, the efficiency of transmission 18 and/or power source 12 may be reduced. That is, because the fluid being relieved from passageway 24 has already been pressurized, energy that was used to pressurize that fluid is wasted. This wasted energy may result in a greater amount of fuel being consumed by power source 12 to move traction device 14.

Additional losses may be incurred during operation of transmission 18. These losses may be associated with leakage. For example, because of clearances between the pistons and bores of pump 20 and motor 22, and of any associated valves, some of the fluid pressurized by pump 20 may not be used to drive traction device 14. Instead, this fluid may leak back to the low pressure side of pump 20 (i.e., back to passageway 26), resulting in a reduced efficiency of transmission 18 and power source 12. This leakage may be represented by passageway 32 in FIG. 1.

Some of the losses of transmission 18 (e.g., the amount of leakage that occurs within transmission 18) may vary based on an input (speed and/or torque) of transmission 18, a temperature of the fluid within transmission 18, a pressure of the fluid, an output of transmission 18, and/or an actual gear ratio of transmission 18. In particular, for a given gear ratio of transmission 18 and for a given temperature of the fluid, a greater input may result in a greater amount of fluid leaking to passageway 26. Similarly, for a given input and for a fixed gear ratio of transmission 18, a warmer fluid (i.e., a fluid having a lower viscosity) may result in a greater amount of fluid leakage. And, for a given input and for a given fluid temperature, a gear ratio of transmission 18 that results in higher pressures therein may cause a greater amount of fluid to bypass motor 22. The leakage of transmission 18 may, through testing, be determined for different combinations of input, output, transmission gear ratio, pressure, and/or fluid temperature, and be stored for future use in the form of tables, equations, or graphs.

To improve the efficiency of transmission 18 and/or power source 12, a control system 38 may selectively regulate operation of transmission 18. Control system 38 may include a controller 40, a fluid sensor 42, an input sensor 44, and an output sensor 45. Controller 40 may be in communication with operator input device 16, pump 20, motor 22, fluid sensor 42, input sensor 44, and output sensor 45 via communication lines 46, 48, 50, 52, 54, and 55, respectively.

Controller 40 may embody a single microprocessor or multiple microprocessors that include a means for receiving input from and providing output to control system 38. Numerous commercially available microprocessors may be configured to perform the functions of controller 40. It should be appreciated that controller 40 may readily embody a general machine microprocessor capable of controlling numerous machine functions. Various other circuits may be associated with controller 40, such as power supply circuitry, signal conditioning circuitry, data acquisition circuitry, signal output circuitry, signal amplification circuitry, and other types of circuitry known in the art.

Fluid sensor 42 may be associated with any one or both of passageways 24 or 26 to measure an actual pressure and/or a temperature of the fluid therein. Fluid sensor 42 may then generate a signal indicative of the measured value, and direct the signal to controller 40 by way of communication line 52.

Input sensor 44 may be associated with transmission 18 to measure an input (i.e., speed and/or torque) thereof. Input sensor 44 may then generate a signal indicative of the measured value, and direct the signal to controller 40 by way of communication line 54.

Output sensor 45 may be associated with transmission 18 to measure an output (i.e., speed and/or torque) thereof. Output sensor 45 may then generate a signal indicative of the measured value, and direct the signal to controller 40 by way of communication line 54.

Controller 40 may include one or more maps 56 stored within an internal memory thereof, which controller 40 may reference during control of transmission 18. Each of these maps 56 may include a collection of data in the form of tables, graphs, and/or equations. For example, a first map may relate the input of transmission 18 as measured by sensor 44, a temperature of the fluid within transmission 18 as measured by sensor 42, an actual pressure of the fluid as measured by sensor 42, the output of transmission 18 as measured by sensor 45, and/or an actual gear ratio of transmission 18 (i.e., ratio of the input to the output of transmission 18) to an efficiency loss (i.e., to an expected leakage amount). In yet another example, a second map may relate the input, the output, the actual transmission gear ratio, the actual pressure, and/or the efficiency loss to an EPOR factor utilized by controller 40 during EPOR control, as will be described in detail below. And, in a final map, the input, the temperature, the output, the actual pressure, the actual gear ratio, and/or the EPOR factor may be related to an expected steady state pressure achieved through EPOR control. It is contemplated that controller 40 may contain fewer, additional, and/or different maps than those described above, if desired.

Figure 2:
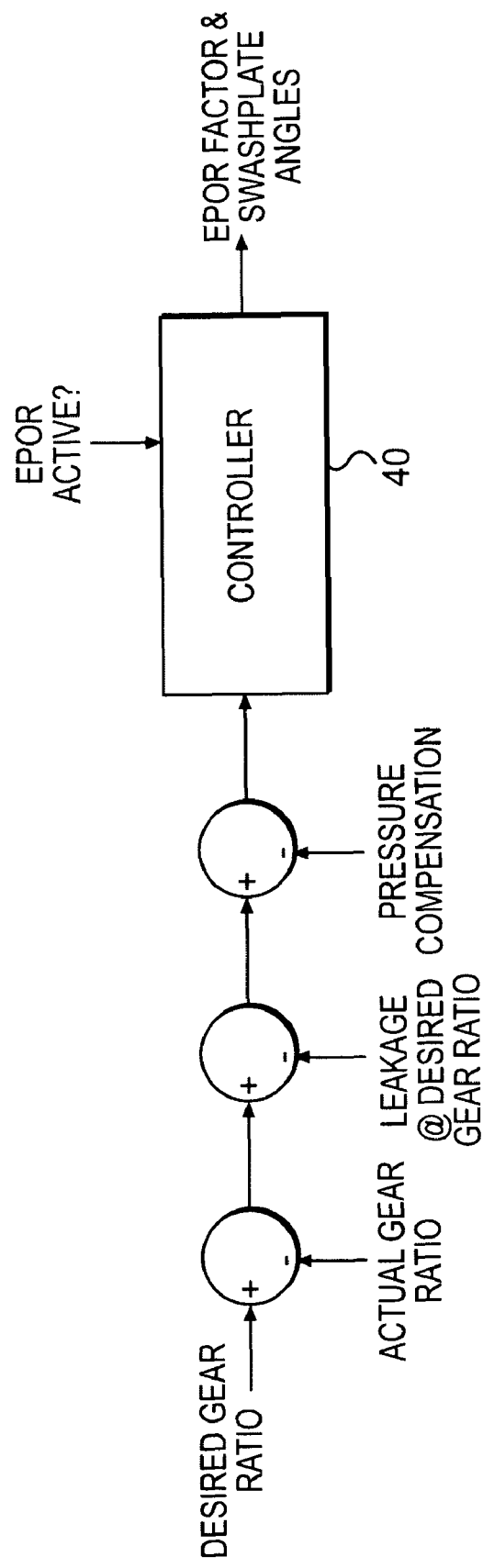
FIG. 2 is a control diagram illustrating an exemplary disclosed operation that may be performed by the machine of FIG. 1.

Controller 40 may reference the maps described above to select a setting of transmission 18 that provides the gear ratio desired by the operator, while accounting for system losses (i.e., while accounting for leakage). In particular, as illustrated in FIG. 2, controller 40 may receive an operator input indicative of a desired transmission gear ratio by way of input device 16. Substantially simultaneously, controller 40 may determine the actual gear ratio of transmission 18 based on signals received from input and output sensors 44 and 45. Controller 40 may then compare the desired gear ratio of transmission 18 with the actual gear ratio to determine a gear ratio error. Controller 40 may then reference the first map described above to determine a predicated leakage amount associated with operation of transmission 18 at the desired gear ratio, and select known displacement settings (or changes to current settings) for pump 20 and/or motor 22 that reduce the gear ratio error (i.e., that make the actual gear ratio substantially match the desired gear ratio) and accounts for the predicted leakage. Controller 40 may then actuate the appropriate servo motors to implement the selected settings. At these settings, the steady state pressure should be lower than the opening pressure of relief valve 34.

Should pressure relief valve 34 be activated (or should a pressure spike be detected), controller 40 may take evasive action to minimize the waste of pressurized fluid by lowering system pressure. This evasive action is known as electronic pressure override (EPOR) control. During EPOR control, when the pressure of transmission 18 exceeds the opening pressure of relief valve 34 and relief valve 34 has opened to relieve the pressures, a signal indicative of this opening may be sent to controller 40 to activate EPOR control. In response to this signal, controller 40 may decrease pump displacement and/or increase motor displacement to reduce the pressure within passageway 24. The amount of change to the displacements of transmission 18 (i.e., the amount the actual gear ratio is reduced from the operator desired gear ratio) may be known as the EPOR factor. It is contemplated that EPOR control may be implemented based on an actual pressure instead of or in addition to the opening of pressure relief valve 34.

EPOR control is also illustrated by the control diagram of FIG. 2. In particular, during normal gear ratio control (i.e., when pressure relief valve 34 has not been opened), the EPOR factor may be "1", and the desired gear ratio may be fully satisfied. However, when EPOR control is active (i.e., when pressure relief valve 34 has been opened), the EPOR factor may be less than "1" and used to scale down the actual gear ratio to an amount less than the desired gear ratio. In this manner, the pressures of transmission 18 may be quickly reduced to a known steady state pressure below the opening pressure of relief valve 34.

Controller 40 may periodically update any one or all of the maps stored in memory thereof to accommodate an aging machine. In particular, based on activation of pressure relief valve 34 (or lack thereof), based on the implementation of EPOR, based on information received from fluid sensor 42, and/or based on known settings, laboratory experimentation, and/or geometry of transmission 18, controller 40 may, in addition to providing a warning to an operator of machine 10, adjust the maps described above. For example, based on a single implementation of EPOR, a predetermined number of implementations, a number of implementations within a predetermined period of time, a resulting steady state pressure after EPOR being substantially different from an anticipated steady state pressure, etc., controller 40 may conclude that an irregularity exists. In response to this conclusion, controller 40 may adjust the maps to reduce the number times that EPOR is implemented, the frequency of implementation, and/or the accuracy of the resulting actual versus anticipated steady state pressures.

Alternatively or additionally, the differences that occur between the expected steady state pressure and the actual steady state pressure following EPOR control may be compensated for when determining the EPOR factor. Specifically, as illustrated in FIG. 2, the difference between the expected and actual steady state pressures may be factored into consideration by controller 40 and used to offset future EPOR factors (e.g., by updating one or more of electronic maps stored in memory). In one embodiment, the steady state pressure may be a maximum operating pressure below the opening pressure of relief valve 34. In this example, the pressure compensation amount may be about equal to the difference between the actual steady state pressure (or an average of steady state pressures) recorded during previous EPOR events and the maximum operating pressure.

As described above, machine 10 may have two drivetrains, each including one transmission 18 and one traction device 14. Controller 40 may be configured to determine the leakage amounts, the EPOR factor, and/or select the known settings for both drivetrains. As such, when controller 40 is determining or selecting these parameters, the pressure and/or temperature values used for these determinations and/or selections may be taken from the drivetrain having the highest values. That is, controller 40 may compare the signals received from each fluid sensor 42, and use only the highest value signal.

INDUSTRIAL APPLICABILITY

The hystat transmission of the present disclosure may be applicable to any machine where understanding and controlling pressure spikes and efficiency is important. The disclosed transmission may minimize the occurrence of pressure spikes by selecting and implementing known gear ratios that produce predictable pressures while quickly accommodating operator demands. Operation of machine 10 will now be explained.

During travel of machine 10, an operator may manipulate input device 16 to indicate a desire for a particular output of transmission 18 (i.e., a desire for a particular gear ratio). For example, the operator may displace input device 16 by 20% in a forward direction to indicate a particular machine travel speed in the forward direction. In response to this input, controller 40 may compare an actual gear ratio of transmission 18 to the desired gear ratio, and determine a gear ratio error. In addition, controller 40 may determine an efficiency loss (i.e., leakage amount) of transmission 18 at the desired gear ratio, and select a known setting of swashplate angles for pump 20 and/or motor 22 that reduces the gear ratio error and accommodates the expected efficiency loss. The known setting, when implemented by controller 40, may force machine travel to the desired level.

During operation, should the pressure of transmission 18 exceed the opening pressure of relief valve 34, EPOR control may be activated. When activated, controller 40 may determine an EPOR factor as a function of transmission input, transmission output, the actual transmission gear ratio, the actual pressure of fluid within transmission 18, and/or the efficiency loss. Controller 40 may then use the EPOR factor to scale down the actual gear ratio and, thereby, reduce system pressures to a know steady state value less than the opening pressure of relief valve 34.

Because the disclosed transmission system may select pump and motor displacement settings known to produce a desired output without exceeding acceptable pressure values, the likelihood and duration of evasive pressure events may be minimized. By minimizing pressure spikes, the disclosed transmission may have improved stability and efficiency.

It will be apparent to those skilled in the art that various modifications and variations can be made to the transmission of the present disclosure without departing from the scope of the disclosure. Other embodiments will be apparent to those skilled in the art from consideration of the specification and practice of the transmission disclosed herein. It is intended that the specification and examples be considered as exemplary only, with a true scope of the disclosure being indicated by the following claims and their equivalents.

What is claimed is:

1. A transmission for a machine, comprising:
a pump;
a motor fluidly connected to receive pressurized fluid from the pump and propel the machine;
a pressure release valve configured to limit a maximum pressure of the transmission;
an operator input device configured to generate a signal indicative of an operator desired gear ratio of the transmission; and
a controller in communication with the pump, the motor, and the operator input device, the controller being configured to:
determine a desired gear ratio as a function of the signal;
determine an efficiency loss of the transmission at the desired gear ratio;
detect activation of the pressure release valve and determine a reduction factor associated with the activation;
select a known setting for at least one of the pump and the motor that provides the desired gear ratio and accounts for the efficiency loss; and scale the known setting by the reduction factor in response to the detected activation of the pressure release valve.

2. The transmission of claim 1, wherein:
the efficiency loss is associated with a leakage rate of the transmission at the desired gear ratio; and
the controller includes a map stored in memory thereof relating the desired gear ratio to the leakage rate.

3. The transmission of claim 2, wherein the map relates the desired gear ratio and at least one of an input of the transmission, an output of the transmission, an actual gear ratio of the transmission, a pressure of the transmission, or a temperature of the transmission to the leakage rate.

4. The transmission of claim 2, wherein the controller is further configured to:
determine an actual gear ratio of the transmission; and
determine the reduction factor as a function of the desired gear ratio, the actual gear ratio, and the efficiency loss.

5. The transmission of claim 4, wherein:
the reduction factor is associated with an expected steady state pressure below an opening pressure of the pressure relief valve; and
the controller is further configured to:
determine a difference between the expected steady state pressure and an actual steady state pressure after scaling; and
compensate future scaling based on the difference.

6. The transmission of claim 5, wherein the controller is further configured to calibrate the map based on the difference.

7. The transmission of claim 5, wherein the controller is further configured to warn an operator of the transmission based on the difference.

8. The transmission of claim 1, wherein the pump has variable displacement, and the controller is configured to implement the selected setting by adjusting the displacement of the pump.

9. The transmission of claim 8, wherein the motor has variable displacement, and the controller is configured to implement the selected setting by adjusting the displacement of the motor.

10. The transmission of claim 1, wherein:
the pump and the motor are connected in a first drivetrain;
the transmission includes a second drivetrain; and
the controller selects the setting based further on the actual gear ratio of the one of the first and second drivetrains having the highest pressure.

11. A method of transmitting power from an engine to a traction device, comprising:
directing a mechanical input from the engine to pressurize fluid;
converting the pressurized fluid to a mechanical output of the traction device;
receiving an input related to an operator desired ratio of the mechanical input to the mechanical output;
activating a pressure release valve if the pressure of the pressurized fluid exceeds a maximum pressure limit;
detecting the activation of the pressure release valve and determining a reduction factor associated with the activation;
determining an efficiency loss as a function of the desired ratio;
selecting a known conversion setting that provides the desired ratio and accounts for the efficiency loss; and
scaling the conversion setting by the reduction factor to reduce fluid pressure in response to the detected activation of the pressure release valve.

12. The method of claim 11, wherein the efficiency loss is associated with a leakage rate of the pressurized fluid.

13. The method of claim 12, wherein the leakage rate is a function of the desired ratio and at least one of an output of the engine, an input of the traction device, an actual ratio, a temperature of the pressurized fluid, or a pressure of the pressurized fluid.

14. The method of claim 11,
wherein determining a reduction factor includes determining a reduction factor as a function of the desired ratio, an actual ratio, and the efficiency loss.

15. The method of claim 14, wherein:
the reduction factor is associated with an expected steady state pressure below the maximum pressure limit; and
the method further includes:
determining a difference between the expected steady state pressure and an actual steady state pressure after scaling; and
compensating future scaling based on the difference.

16. The method of claim 15, further including warning an operator based on the difference.

17. The method of claim 11, wherein:
the traction device is a first traction device;
the engine is connected to fluidly drive the first traction device and a second traction device;
the method further includes:
detecting a first fluid pressure associated with driving the first traction device; and
detecting a second fluid pressure associated with driving the second traction device; and
the conversion setting is selected as a function of the desired conversion ratio and an actual ratio of the mechanical input to the mechanical output of the one of the first and second traction devices associated with the higher of the first and second fluid pressures.

18. A machine, comprising:
an engine configured to produce a mechanical output;
a traction device configured to receive a mechanical input and propel the machine; and
a transmission fluidly connecting the mechanical output to the mechanical input, the transmission including:
a pump having variable displacement and being connected to the mechanical output of the engine;
a motor having variable displacement, being configured to receive pressurized fluid from the pump, and being connected to the mechanical input of the traction device;
a pressure relief valve configured to limit a maximum pressure of the transmission;
an operator input device configured to generate a signal indicative of an operator desired gear ratio of the transmission; and
a controller in communication with the pump, the motor, and the operator input device, the controller being configured to:
determine a desired gear ratio as a function of the signal;
determine an efficiency loss of the transmission at the desired gear ratio;
detect activation of the pressure release valve and determine a reduction factor associated with the activation;
select a known setting of at least one of the pump and the motor that provides the desired gear ratio and accounts for the efficiency loss; and scale the known setting by the reduction factor in response to the detected activation of the pressure release valve.

19. The machine of claim 18, wherein:

the efficiency loss is associated with a leakage rate of the transmission at the desired gear ratio; and the controller includes a map stored in memory thereof relating the desired gear ratio and at least one of an input of the transmission, an output of the transmission, an actual gear ratio of the transmission, a pressure of the transmission, or a temperature of the transmission to the leakage rate.

20. The machine of claim 19, wherein the controller is further configured to:

determine an actual gear ratio of the transmission;

determine the reduction factor as a function of the desired gear ratio, the actual gear ratio, and the efficiency loss, the reduction factor being associated with an expected steady state pressure below an opening pressure of the pressure relief valve;

determine a difference between the expected steady state pressure and an actual steady state pressure after scaling; and compensate future scaling based on the difference.

\* \* \* \* \*